United States Patent [19]
Salvail

[11] 3,847,136
[45] Nov. 12, 1974

[54] SOLAR WATER-HEATING SYSTEMS

[76] Inventor: Napoleon Paul Salvail, 830 Margie Dr., Titusville, Fla. 32780

[22] Filed: July 27, 1973

[21] Appl. No.: 383,194

[52] U.S. Cl. ............................................. 126/271
[51] Int. Cl. ............................................. F24j 3/02
[58] Field of Search ........................... 126/270, 271

[56] References Cited
UNITED STATES PATENTS

| | | | |
|---|---|---|---|
| 1,855,815 | 4/1932 | Abbot | 126/271 |
| 1,946,184 | 2/1934 | Abbot | 126/271 |
| 2,133,649 | 10/1936 | Abbot | 126/271 |
| 2,205,378 | 6/1940 | Abbot | 126/271 |
| 2,553,302 | 5/1951 | Cornwall | 126/271 X |
| 2,872,915 | 2/1959 | Bowen | 126/271 |
| 3,076,450 | 2/1963 | Gough et al. | 126/271 |
| 3,125,091 | 3/1964 | Sleeper, Jr. | 126/271 |
| 3,129,703 | 4/1964 | Tabor | 126/270 |

*Primary Examiner*—William F. O'Dea
*Assistant Examiner*—Peter D. Ferguson

[57] ABSTRACT

This invention deals with improvements in the fabrication and operation of a solar water-heating system utilizing semicylindrical reflecting surfaces. The semicylindrical reflecting surfaces are formed from foamed or expanded plastics with a combination bearing and seal at each end, through which the longitudinal, heat collecting tubes pass. A center, fixed support bearing that maintains the sealed enclosure is provided for longer heat collecting tubes. A linear actuating linkage is provided for rotation to follow the sun's motion daily and seasonally. The measurement of differential temperatures within the enclosure of the reflecting surface, controls operation of the circulation pump that circulates the heated liquid to a heat exchanger.

3 Claims, 4 Drawing Figures

PATENTED NOV 12 1974

SOLAR WATER-HEATING SYSTEMS

SUMMARY

This invention relates to improvements in the fabrication and operation of a solar water-heating system. The type of solar water heater described is one that uses semicylindrical reflecting surfaces focusing the sun's rays on longitudinal, heat-collecting transfer tubes. This type of collector is the subject of numerous patents. The intention of this inventor has been to take the basic concept and, by using a series of new approaches for the fabrication and operation, develop a solar water-heating system that can be produced economically for widespread use. Traditionally, the semicylindrical reflecting surfaces have been made from silvered or metalized glass and polished or plated metal sheets. My approach has been to utilize materials such as plastic, which can be formed, molded, or extruded into the desired shape, and relatively inexpensive foil or metalized plastic materials for the reflecting surface.

The objects of my invention will be more clearly apparent from the following disclosure and the drawings, wherein.

Figure 1:
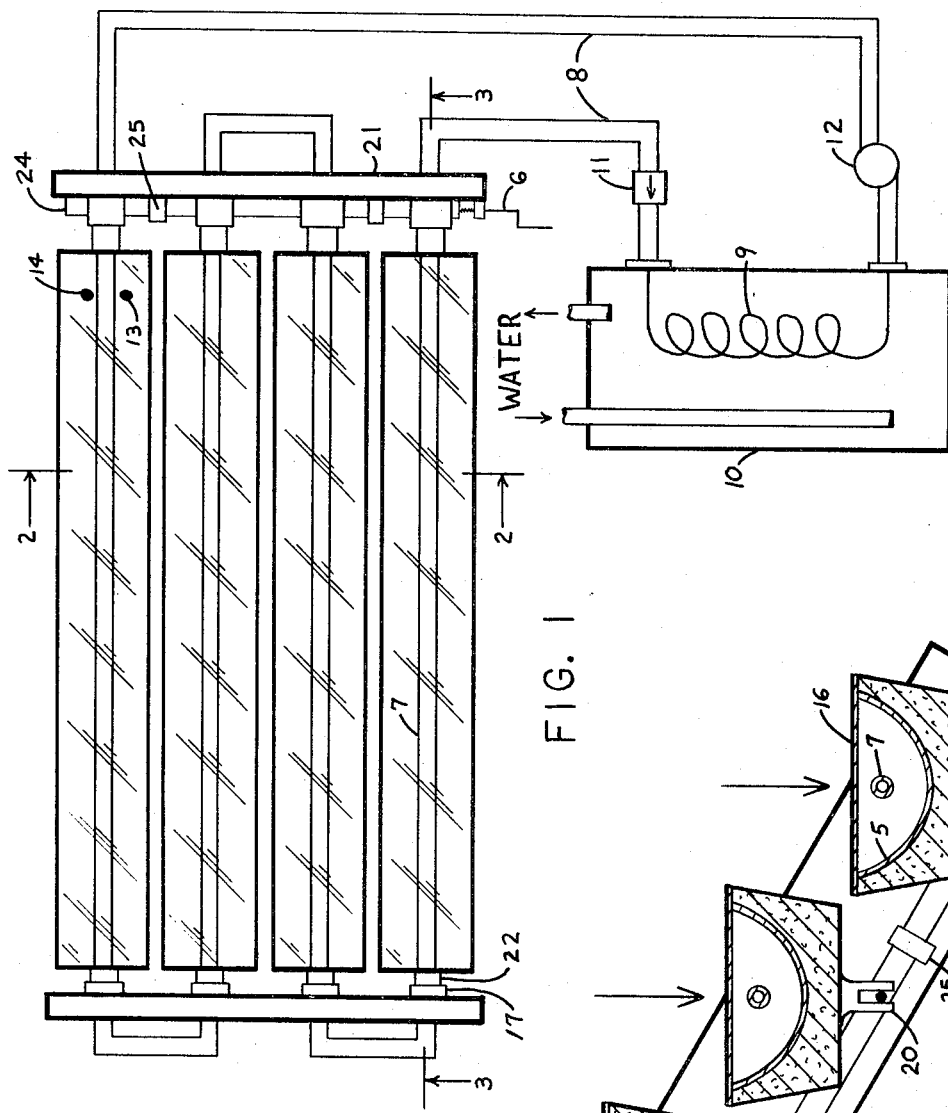
FIG. 1 is a view of the system incorporating the improvements of my invention.

The system functions as most solar water-heating systems which utilize forced circulation of the heat-transfer fluid. During operation of the system, the reflecting surfaces 5 are pointed by means of a rotating threaded shaft 6 which, by means of a linear actuating linkage 24, tilts the surfaces such that the sun's rays are brought to focus on the fluid transport tubes 7.

The heat-transfer fluid is circulated through the tubes 7 where heat is absorbed; then the fluid is circulated through insulated lines 8 to another heat exchanger coil 9 in a hot-water storage tank 10. A check valve 11 is incorporated to eliminate heat loss during periods without sunlight due to the natural convection currents that occur when the hot-water storage tank is located below the level of the heat collector.

Operation of the circulation pump 12 is controlled with a differential temperature measurement 13 and 14 in one of the semicylindrical tubes. Thermistor sensors are proposed for this purpose, with one located at the focal point 13 and one sensing the shaded temperature 14 in the closed tube chamber 15. It is recognized that other methods of detecting temperature could be utilized to accomplish this purpose, such as thermocouples, semiconductors, and/or bimetallic elements. The sensor at the focal point 13 is required to be 15° Fahrenheit above the shaded temperature point 14 before the circulation pump is activated. The use of differential temperature in the semicylindrical tube assures that the heat-transfer fluid is only circulated when there is sensible heat to be collected and thereby conserving energy required to run the circulation pump.

Figure 4:
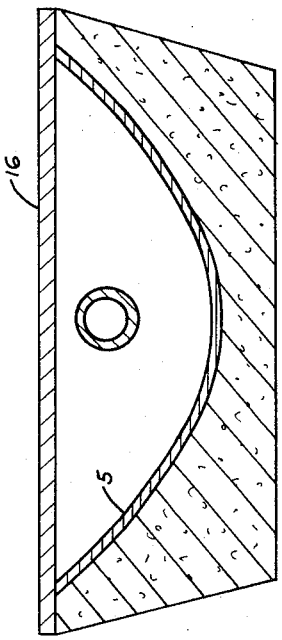
FIG. 4 is a cross section of a typical semicylindrical tube of improved construction.

Since the principle factor influencing the widespread acceptance of a solar water-heating system is cost, a new approach has been taken to achieve this goal. Construction of the semicylindrical reflecting tubes as shown in FIG. 4 is based on the use of a foamed or expanded structural plastic with suitable strength and environmental exposure properties.

The inventor has produced units fabricated from rigid polyurethane foam with satisfactory results. Other plastic compounds such as polystyrene, acrylonitrile-butadiene-styrene, or polyvinyl chloride may provide advantages.

Figure 3:
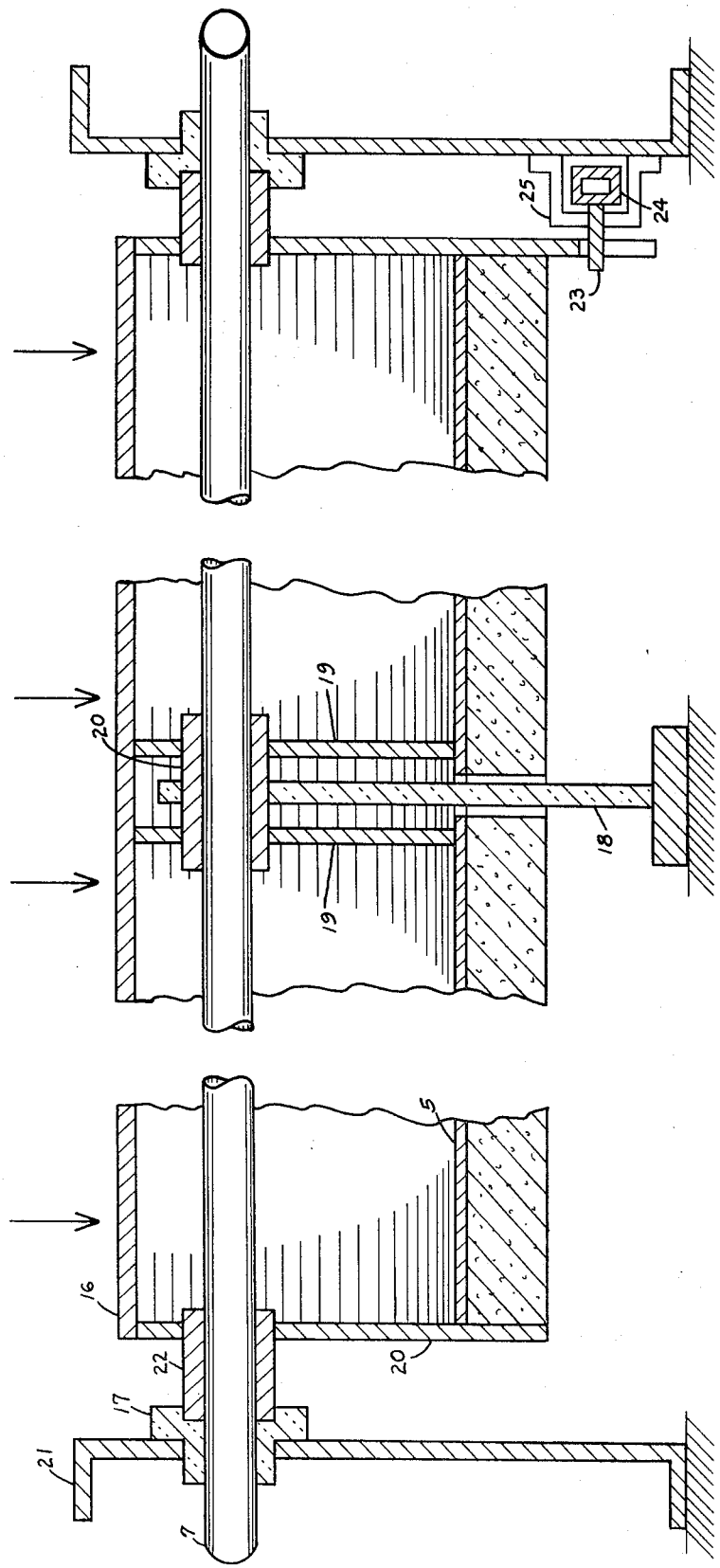
FIG. 3 is a longitudinal cross section of the entire semicylindrical tube, including the combination bearing and sealing surfaces in either end, and the optional midpoint bearing-and-support strut. Also shown is the pointing linkage.

These semicylindrical tubes may be either foamed, molded, or extruded. The reflecting surface 5 in the inner surface of the tube may be one of several materials. A highly reflective aluminum foil or aluminized material such as polyester has been utilized with good results. The use of a thin film reduces the costs for the surface. This is in contrast to the traditionally used or prepared surfaces consisting of polished or plated metal sheet. A bright metallic-plated surface may also be used with a suitable plastic substrate. The transparent surface material 16 used in acrylic plastic sheeting, but significant cost savings can be realized by going to a thin film such as Teflon or Tedlar with a thickness of .010 inches for the fabrication concept illustrated. The fluid-transfer tubes 7 chosen were cylindrical due to the ease of fabrication and availability. This also permits the use of a unique, combination bearing and seal as shown in FIGS. 1 and 3. Both parts of the bearing and seal 17 and 22 are fabricated of a plastic material such as nylon, with a silicone-grease lubricant between the sliding bearing surfaces. The outer piece of the assembly 17 is fixed in the end support structure 21; the inner piece 22 is fastened to the end closure 20 of the semicylindrical tube, rotating about the fluid-transfer tube 7 and transfering structural loads to the outer bearing piece 17. The fluid-transfer tube 7 is fixed and does not rotate within the outer bearing 17. The bearing-and-seal assembly acts as a barrier to outside rain and dust, providing a sealed, low-friction bearing for ease of pointing.

When utilizing longer fluid-transfer tubes (10 to 20 feet), a central bearing and support 18 can be incorporated. FIG. 3 illustrates this assembly. This concept allows support of the fluid-transfer tube while maintaining the sealed environment and allowing movement for pointing. Tube closures 19 are provided on either side of the bearing-and-support strut 18 with a piece of plastic bearing material providing a sealed bearing-and-support piece 20 between fluid-transfer tube 7 and bearing-and-support strut 18.

Figure 2:
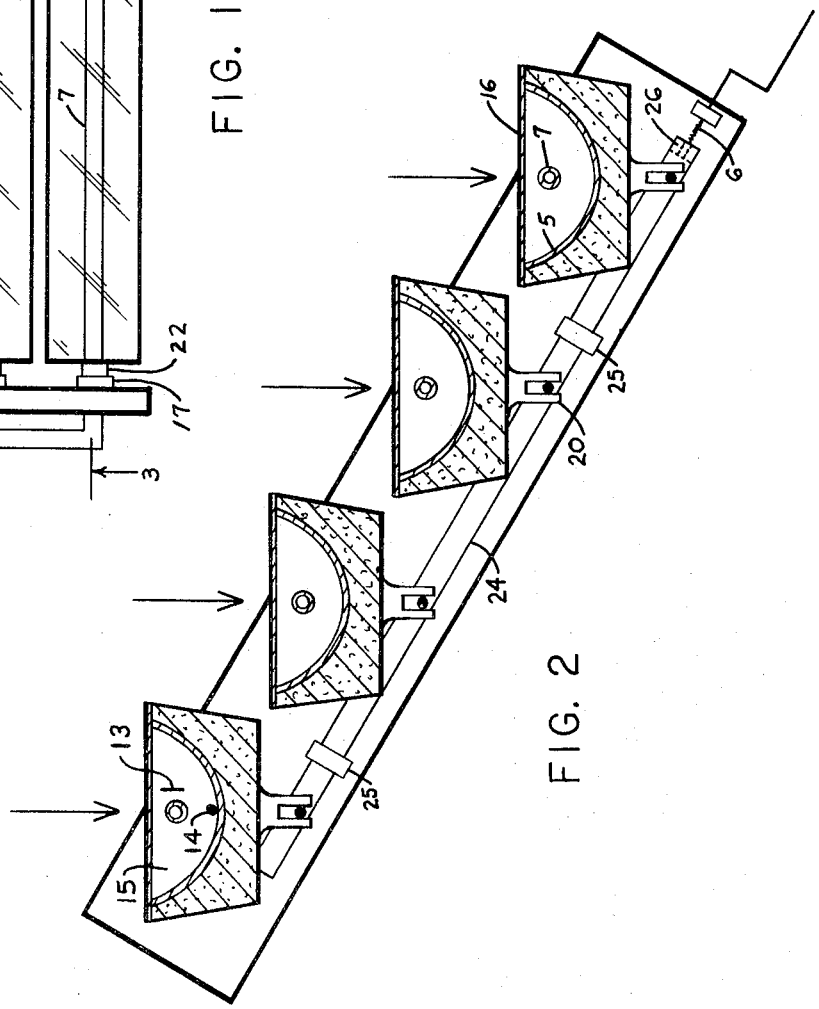
FIG. 2 is the collection assembly, showing the location of differential temperature sensors and cross sections of the semicylindrical tube and linkage for pointing the reflecting surfaces.

The pointing-and-actuator mechanism is shown in FIGS. 1, 2, and 3. FIGS. 2 and 3 show the end closures 20 of the semicylindrical tube with actuator slots for movement. By means of these actuator slots and fixed pins 23 on the actuator linkage 24, a linear motion within the actuatorlinkage guide bearings 25 causes rotation of the semicylindrical tubes about the bearing surface of the fluidtransfer tube. By means of a stationary, rotating, threaded rod 6 and threaded bearing 26 in the end of the actuator linkage 24, the semicylindrical tubes can be pointed toward the sun as it moves daily and seasonally. The screw thread 6 in a low-friction, threaded bearing assembly 26, such as a fluoroplastic, has provided a simple but rugged mechanism to point the reflecting surfaces. A small reversible motor with a gear reduction unit has been utilized by the inventor to turn the threaded rod.

The consolidation of the pointing and actuator mechanisms in the same end as the heat-transfer-fluid inlet and outlet (FIG. 1) has the advantage of simplifying the installation of this solar water-heating system. Since rigid, semicylindrical reflecting tubes of the proper length (less that 10 feet) require no central supports, they can be freely supported with a bearing-and-seal assembly 17 and 22 at each end as shown in FIGS. 1 and 3.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What I claim is:

1. In a solar heat collector, a frame comprised of a plurality of fluid transfer tubes in perpendicularity to end support structures; a fluid transfer tube having a stiff self-supportive semicylindrical member mounted thereon; said fluid transfer tube having a bearing supporting the semicylindrical member and allowing rotation of the member about the fluid transfer tube; said bearing also sealing the hollow semicylindrical member; said bearing comprising a first bearing piece rigidly attached to the end of a semicylindrical member and extending outwardly therefrom; said first bearing piece being concentrically and rotatably disposed about said tube; and a second bearing piece rigidly attached to said support structure also concentrically disposed about said tube; said second bearing piece having an annular recess into which said first bearing piece extends for support thereby, while providing a sealed, low friction bearing surface between said first and second bearing pieces, said first bearing piece being in abutting relationship with the bottom of said annular recess.

2. A solar energy collector as defined in claim 1, in that said first and second bearing pieces are fabricated of self-lubricating plastic.

3. A method of operating a solar heat collector, which collector comprises a stiff self-supportive semicylindrical member having a reflective surface thereon and covered with a transparent covering; said member configured to concentrate solar energy on an elongated restricted area within the confined space of the member and having a fluid transfer tube extending through the entire length of the restricted area; said fluid transfer tube containing a heat transfer fluid;

a first temperature measurement device placed within said restricted area; and a second temperature measurement device placed within the confined space of said member, being outside said restricted area;

said method comprising the step of activating a heat-transfer-fluid circulation pump when the difference in the temperature measurement of said first temperature measurement device and said second temperature measurement device reaches a predetermined value, indicating the availability of sensible heat to be collected.

* * * * *